UNITED STATES PATENT OFFICE 2,657,169

N-AMINOPHTHALIC IMIDES AND SALTS THEREOF AS FUNGICIDAL COMPOSITIONS

Waldo B. Ligett, Berkley, Rex D. Closson, Detroit, and Calvin N. Wolf, Ferndale, Mich., assignors to Ethyl Corporation, New York, N. Y., a corporation of Delaware No Drawing. Application October 28, 1950, Serial No. 192,805

11 Claims. (Cl. 167—33)

This invention has for its object the production of a new group of superior fungitoxic materials, and methods for their use in protecting agricultural, organic and related articles from attack by fungi.

We have found that certain compositions containing selected phthalic imides possess unusual fungicidal properties. Alone, these materials are too powerful for safe application, but when suitably diluted as hereinafter described they are excellent fungicides.

By the term "fungicide" we mean to include not only the property of destroying fungi, but also the property of inhibiting the germination of the spores of the fungi.

In particular the compounds of our invention comprise the N-aminophthalic imides, and the N-amino salts thereof, of the following general structure

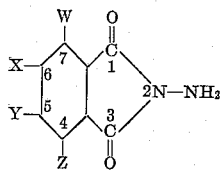

wherein W, X, Y and Z are the same or different and are chosen from hydrogen, the halogens and nitrogen containing groups.

We have found that the simplest member of our new class of fungicides is the unsubstituted compound, N-aminophthalic imide. Other examples of our fungicidally active materials include N-aminophthalic imides substituted with one or more halogens on the aromatic radical, such as the mono-, di-, tri- and tetra-chlorosubstituted N-aminophthalic imides. Likewise, the corresponding bromo-, fluoro- and iodo-substituted N-aminophthalic imides show excellent fungitoxic properties. In the same fashion our fungicides can be substituted with one or more nitro or amino groups, or any combination thereof. Finally, our fungicides can be substituted with any combination of halo, amino or nitro substituents.

In general, we have found that the introduction of such substituents into the aromatic nucleus produces an intensification of the fungicidal action. In addition, by so-modifying the compounds of our invention, the physical properties, in particular the volatility, solubility and melting point, are modified so that for any particular application it is possible to choose that particular embodiment of our fungicides which possesses the most desirable combination of properties. It is not essential that only one substituent type be employed in our fungicides, and for some uses it is preferable to employ a combination of substituents, as for example the chlorobromo-, dichlorobromo-, chlorofluoro-, dichlorodibromo-, or trichloroiodo- derivatives, or the chloronitro-, aminonitro-, dichloronitro-, chlorofluoronitro-, chlorobromoamino-, chloroamino-, iodoaminonitro-, chlorodinitro-, or bromonitro- derivatives. In general, the relative position of the substituents on the aromatic radical appears to have little, if any, effect on the potency of the fungicide.

Specific examples of the fungitoxic N-aminophthalic imides which come within the scope of our invention include the 4-chloro-, 5-chloro-, 4,5-dichloro-, 4,6-dichloro-, 4,7-dichloro-, 4,5,6-trichloro-, 4,5,7-trichloro-, 4,5,6,7-tetrachloro- N-aminophthalic imides and the corresponding bromo-, fluoro- and iodo- compounds. Typical examples of mixed halogen N-aminophthalic imides of our invention include the 4-chloro-5-bromo-, 4-bromo-6,7-dichloro-, 5-fluoro-6-chloro-, 4-chloro-7-fluoro-, 4,6-dichloro-5-fluoro-, 4,5,6-trichloro-7-bromo- and 4,6,7-trichloro-5-iodo-N-amino-phthalic imides.

The aromatic nitrogen- containing N-aminophthalic imides which constitute our fungicidal materials can be illustrated by the following examples: 4-nitro-, 4,6-dinitro-, 4-amino-6-nitro-, 4-nitro-6-amino-, 4,7-diamino- and 5,6-diamino- N-aminophthalic imide. Furthermore, the halogen and nitrogen-containing groups can be substituted at the same time on the aromatic radical as in the following illustrative examples: 4-chloro-6-amino-, 4,6-dinitro-5-chloro-, 4,5-dichloro-6-fluoro-7-nitro-, 5-bromo-4,6-dinitro-, and 4-iodo-6-nitro-N-aminophthalic imide.

The N-aminophthalic imides which comprise the active fungicides in accordance with the present invention are basic materials, and form stable salts with acids, both organic and inorganic. The resulting salts possess the same order of fungitoxicity as the free bases and for some applications are preferred. Examples of salts which comprise such an embodiment of our invention include the hydrochlorides, sulfates, nitrates, molybdates, and borofluorates as typical inorganic salts, and the acetates, mono-, di- and tri-chloroacetates, the phenates, picrates, benzenesulfonates, pentachlorophenates, naphthalenesulfonates, and dinitrobenzoates as typical examples of organic salts. In general, our N-aminophthalic imides form those salts normally expected from organic bases, and all such salts possess the fungicidal activity associated with our fungicides in the form of the free bases.

In most instances our N-aminophthalic imides are readily prepared in good yield by treating the appropriate phthalic anhydride with hydrazine in boiling ethanol. However, for the parent compound, N-aminophthalic imide, the reaction must not proceed for longer than three to five minutes, or the only product recovered is the six-membered condensation product, 2,3-dihydrophthalazine-1,4-dione.

One method of applying our fungicides is in the form of a water suspension, wherein a surface active agent has been incorporated in sufficient amount to disperse and suspend the fungicide. Examples of such surface active agents which can be employed in forming dispersions include salts of the alkyl and alkylaryl sulfonates, such as du-Pont MP-189 and Nacconol-NR, alkyl sulfates, such as Dreft, alkylamide sulfonates, such as Igepon-T, the alkylaryl polyether alcohols, such as Triton X-100, the fatty acid esters of polydric alcohols, such as Span, the ethylene oxide addition products of such esters, as for example Tween, and the addition products of long-chain mercaptans and ethylene oxide, such as Sharples' Non-Ionic-218. Still other surface active agents can be employed, the above merely showing a representative list of the more common materials.

The solubility of the N-aminophthalic imides and certain of their salts in organic solvents, furthermore, is such that they can be applied advantageously in the form of solutions in this type of solvent, and for certain applications this method of application is preferred. For example, in treating cloth, leather or other fibrous articles it may be desirable to apply our fungicides dissolved in a volatile solvent. After use the volatile solvent evaporates leaving the fungicide impregnated throughout the surface of the article. Likewise, in applying our fungicides to smooth surfaces, as for example in treating wood surfaces for protection against fungus attack, a solution may be the most practical method for applying a protective film by brushing, spraying or dipping. The choice of an appropriate solvent is determined largely by the concentration of active ingredient which it is desired to employ, by the volatility required in a solvent, the spreading or flow characteristics thereof, and by the nature of the material being treated. Among the many organic solvents which can be employed as the carrier for our fungicides we can employ hydrocarbons, such as benzene or toluene; ketones, such as acetone and methylethyl ketone; chlorinated solvents, such as carbon tetrachloride, trichloro- and perchloro-ethylene; and esters, such as ethyl, butyl and amyl acetates; and alcohols, such as ethanol, isopropanol, and amyl alcohols. Among the solvents which we prefer to employ are the carbitols and cellosolves, the former comprising in general the monoalkyl ethers of diethylene glycol and the latter the monoalkyl ethers of ethylene glycol. In addition, combinations of these various typical solvents can be employed whereby special volatility and viscosity characteristics can be imparted to our formulations.

In addition to the above-described methods of wet application of the N-aminophthalic imides and their salts, we can prepare compositions in which our materials are extended in talc, clay or other solid diluents. Such formulations have particular utility in the treatment of seeds, wherein an aqueous application may promote premature germination, or where a solvent application may damage the seed. For certain field crop applications we also prefer a dust formulation wherein a wet application might introduce certain secondary effects which are undesirable. Further specific examples of such typical inert solid carriers which can be employed as diluents in our dust formulations include fuller's earth, pyrophillite, attaclay and the filtrols.

Further, we can employ a combination of the above methods of application of our fungicides. Thus, we can incorporate a surface-active agent or lubricant in our dust formulations, not only to insure a uniform dry mixture, but also to enhance the spreading characteristics on application. Of particular utility for such formulations are the alkyl or alkylaryl sulfonate detergents. Likewise, a solvent formulation can be employed along with water, or water and a surface-active agent. Such surface-active agents can be chosen, for example, from the types represented by Triton X-100, Sharples' Non-Ionic-218 or Tween. For example, we can dissolve our fungicides in a solvent such as ethyl acetate along with a dispersant, and before application this concentrate can be added to water, thereby producing a suspension of the fungicide in water, at the desired concentration for application. In addition, we can incorporate an adherent or sticking agent, or a humectant in any of the above formulations. Furthermore, these formulations can be employed in admixture with other fungicidal materials or other biocides such as insecticides, larvicides, bactericides, vermicides, miticides, or with other materials which it is desired to apply along with our fungicide, such as for example herbicides or fertilizers.

We have illustrated the utility of our N-aminophthalic imides, both as the free bases and in the form of the amine salts, as fungitoxic materials by determining the concentration at which the germination of 50 per cent of the spores of each of the fungi *Alternaria oleracea* and *Sclerotinia fructicola* is inhibited. The former is responsible for the potato blight, while the latter causes peach rot. These fungi are representative of fungus types which are responsible for heavy crop damage. The ability to control these fungi is a reliable indication of the general applicability or our fungicides to protect these and other important agricultural crops. These tests were conducted as follows: 100 parts of the active ingredient was triturated with 1,000 parts of distilled water containing one part of the commercial dispersant Triton X-100. This standard suspension was thereupon further diluted with distilled water and the concentration at which one-half of the fungi contained in a drop of water on a microscope slide were prevented from sporilating was determined. Against both *S. fructicola* and *A. oleracea* the effective concentration of 4,5,6,7-tetrachloro-N-aminophthalic imide was less than 10 p. p. m. When a similar suspension of the following typical members of our new class of fungicides is applied to these fungi and the inhibition is determined, equally good results are obtained: N-aminophthalic imide, 4-nitro-N-aminophthalic imide, 4-amino-N-aminophthalic imide, 4,7-dichloro-N-aminophthalic imide, 4-nitro-6-chloro-N-aminophthalic imide, 4,5,6,7-tetrabromo-N-aminophthalic imide, 4-nitro-6-amino-N-aminophthalic imide, 4-amino-6-chloro-N-aminophthalic imide, 5,6-dichloro-N-aminophthalic imide, 4-fluoro-6-nitro-N-aminophthalic imide, or 4-amino-5-nitro-7- fluoro-N-aminophthalic imide. The salts of our fungicides give similar results when tested in this fashion. This standard slide-germination method is described by the Committee on Standardization of Fungicidal Tests of the American Phytopathological Society in "Phytopathology," 33, 627 (1943).

We have established that the fungicides of our invention are non-toxic to seeds and seedlings by incubating cucumber and rye seeds at a temperature of 25° C. in the dark for four and seven days, respectively, in Petri dishes containing a filter paper moistened with aqueous suspensions of our N-aminophthalic imides and salts thereof. Suspensions of our materials were prepared by dispersing one part in 10,000 parts of water containing 0.1 part of Santomerse-S, thus producing a suspension of 100 p. p. m. of active ingredient. At the end of the incubation period we compared the growth of the primary root tip of the cucumber seed and the growth of the rye coleoptile with that obtained on seeds incubated with distilled water. We found no significant inhibition, compared with the controls, when germination proceeded in the presence of our fungicides. Germination of the treated seeds was as complete as the control.

It is important that a fungicidal composition does not cause damage to the leaves, stem, blossom, or fruit of a plant to which it is applied. When we dipped the entire leaf of each of corn, soybean, tomato, cucumber and cotton plants in suspensions of our fungicides at concentrations as high as 10,000 p. p. m., we observed no effect on the so-treated plants or upon the leaves which were dipped. These dispersions were made according to the procedure of the previous example. Furthermore, each of these plants was totally sprayed with dispersions of our fungicides in water at a concentration of 10,000 p. p. m. without any significant effect on the plant. In addition to the typical examples enumerated above, when the leaf of these plants is dipped in suspensions of 4,5,6-trichloro-N-aminophthalic imide, 4,6-dichloro-7-bromo-N-aminophthalic imide, 4,5-dichloro-6-nitro-7-fluoro-N-aminophthalic imide, 4-amino-7-bromo-N-aminophthalic imide, or 5-chloro-6-iodo-N-aminophthalic imide at this concentration of active ingredient, no damage or significant effect is observed. In like manner the salts of our fungicides produce no adverse effect on plants at this concentration.

Listed below are several representative diseases of plants which can be controlled by our fungicidal materials and also the fungus organisms which are responsible for these phytopathological conditions.

DISEASES OF FRUITS

| | |
|---|---|
| Apple scab | Venturia inaequalis |
| Peach and cherry rots | Sclerotinia fructicola |
| Pear blight | Erwinia amylovora |
| Strawberry leaf spot | Mycosphaerella fragaria |
| Cherry leaf spot | Coccomyces hiemalis |
| Citrus scab | Elsinoe fawcettio |
| Citrus stem end rot | Diaporthe citri |

DISEASES OF GRAINS

| | |
|---|---|
| Wheat stem rust | Puccinia graminis |
| Wheat leaf rust | Puccinia triticina |
| Oat crown rust | Puccinia coronata |
| Sweet corn smut | Ustilago zeae |
| Rice brown spot | Helminthosporium oryzae |
| Corn rot | Diplodia zeae / Gibberella zeae / Fusarium monilliforme |
| Oat smut | Ustilago avenae / Ustilago levis |

DISEASES OF TUBERS

| | |
|---|---|
| Sweet potato stem rot | Fusarium botatis / Fusarium hyperoxysporum |
| Potato late blight | Phytophthora infestans |
| Sugar beet leaf spot | Cercospora beticola |
| Sweet potato black rot | Ceratostomella fimbriata |
| Potato Rhizoctoniose | Rhizoctonia solani |
| Potato scab | Actinomyces scabies |

MISCELLANEOUS VEGETABLE CROP DISEASES

| | |
|---|---|
| Tomato early blight | Alternaria solani |
| Pea root and stem rots | Aphanomyces sp. / Fusarium sp. |
| Tomato septoria blight | Septoria lycopersici |
| Peanut leaf spot | Cercospora personata |
| Celery late blight | Septoria apii |
| Cabbage black leg | Phoma lingam |
| Cucurbits down mildew | Peronoplasmopara cubensis |

MISCELLANEOUS

| | |
|---|---|
| Cotton wilt | Fusarium vasinfectum |
| cotton root rot | Phymatotrichum omnivorum |
| Cotton blights and boll rot | Rhizoctonia solani / Sclerotium bataticola / Diplodia gossypina |
| Tobacco blue mold | Peronospora tabacina |
| Tobacco wild fire | Phytomonas tabacum |

As one example of a method of formulating dust containing our fungicides, we ground 100 parts of tetrachloro-N-aminophthalic imide with 1900 parts of talc such that the particles in the formulation were smaller than 80 mesh, and the concentration of active ingredient was 5 per cent. On treating N-aminophthalic imide, or any of the other fungicides of our invention, either as a free base or as a salt, with a similar solid diluent, dust formulations are prepared of equal effectiveness, and as readily.

We prepared oil-in-water emulsions of our fungicides as follows: a saturated solution of N-aminophthalic imide in benzene was added, with agitation, to water containing a small amount of Triton X-100, thus obtaining a dispersion suitable for application as a spray. In a similar fashion, for example a dispersion is made of 4-nitro-N-aminophthalic imide, 4-amino-7-chloro-N-phthalic imide and other fungicides of our invention.

It is evident from the foregoing that our fungicides can be first formulated into a concentrate, wherein an inert diluent is admixed therewith, and finally diluted to an appropriate concentration for application with the same or different diluent. In general, from practical considerations, we prefer to prepare a concentrate containing up to approximately 50 weight per cent of our fungicides. If preferred, however, our fungicides can be diluted to application strength all at once. In either case, our fungicides when incorporated in the diluent are stable on storage and can be satisfactorily handled in either the diluted or concentrated state.

The fungicides of our invention also protect other materials besides plants and seeds. Examples of such materials, which are susceptible to attack by fungus organisms and which are protected by treatment with N-aminophthalic imides and their salts, include wood, cloth fabrics, leather, fur, hair, feathers, felting, painted or otherwise coated surfaces, and other articles of manufacture which comprise organic materials or are coated with such organic materials. Our fungicides can be applied to such materials as sprays, dusts, or dips, or can be brushed on, depending on the particular characteristics of the article or material which it is desired to protect from fungus attack. Furthermore, our fungicides are useful as soil disinfestants and can be applied directly thereto, thus providing protection to seeds, roots and emergent seedlings, or other material embedded in soil, such as for instance wood, cloth or other articles from soil-infesting fungi.

Other methods of employing the fungicidal compositions of our invention and other materials which can be protected from attack by fungus organisms will be apparent to those skilled in the art and the above specific examples are intended only to illustrate our invention. However, we do not intend that our invention be limited to these specific examples.

We claim:

1. A fungicidal composition, consisting of a uniform dispersion of an active ingredient, present in amount less than about 50 per cent by weight, which is selected from the group consisting of a compound possessing the general formula

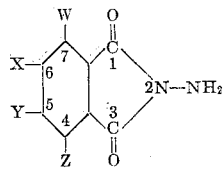

and salts thereof, wherein W, X, Y and Z are selected from the group consisting of hydrogen, halogen, nitro, and amino, in admixture with an inert fungicidal adjuvant as a carrier therefor.

2. The fungicidal composition of claim 1 wherein at least one of W, X, Y and Z is chlorine.

3. The fungicidal composition of claim 1, wherein at least one of W, X, Y and Z is a nitro group.

4. The fungicidal composition of claim 1 wherein at least one of W, X, Y and Z is an amino group.

5. The fungicidal composition of claim 1 wherein each of W, X, Y and Z are hydrogens.

6. The method of protecting materials susceptible to fungus attack which comprises coating the surface of said materials with the composition of claim 1.

7. The method of protecting materials susceptible to fungus attack which comprises coating the surface of said materials with the composition of claim 2.

8. The method of protecting materials susceptible to fungus attack which comprises coating the surface of said materials with the composition of claim 3.

9. The method of protecting materials susceptible to fungus attack which comprises coating the surface of said materials with the composition of claim 4.

10. The method of protecting materials susceptible to fungus attack which comprises coating the surface of said materials with the composition of claim 5.

11. A fungicidal composition consisting of a uniform dispersion of 4,5,6,7-tetrachloro-N-aminophthalic imide present in amount less than about fifty per cent by weight in admixture with a fungicidal adjuvant as a carrier therefor.

WALDO B. LIGETT.
REX D. CLOSSON.
CALVIN N. WOLF.

References Cited in the file of this patent

UNITED STATES PATENTS

| Number | Name | Date |
|---|---|---|
| 2,389,427 | Gertler | Nov. 20, 1945 |

OTHER REFERENCES

Mihailescu et al., Chemical Abstracts, volume 25, page 1511 (1931).

Siegler et al., Journal Economic Entomology, volume 39, pages 549 et seq. (1946).